(12) United States Patent
Ho et al.

(10) Patent No.: US 10,565,995 B1
(45) Date of Patent: *Feb. 18, 2020

(54) VOICE-BASED INTERACTIVE NETWORK MONITOR

(71) Applicant: TP Lab, Inc., Palo Alto, CA (US)

(72) Inventors: Chi Fai Ho, Palo Alto, CA (US); John Chiong, San Jose, CA (US)

(73) Assignee: TP Lab, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/451,007

(22) Filed: Jun. 25, 2019

Related U.S. Application Data

(63) Continuation of application No. 15/817,209, filed on Nov. 18, 2017, now Pat. No. 10,381,008.

(51) Int. Cl.
| | |
|---|---|
| *G06F 3/16* | (2006.01) |
| *G10L 15/22* | (2006.01) |
| *G10L 15/30* | (2013.01) |
| *H04L 12/26* | (2006.01) |
| *G06F 16/951* | (2019.01) |
| *G10L 15/183* | (2013.01) |

(52) U.S. Cl.
CPC ............. *G10L 15/30* (2013.01); *G06F 3/167* (2013.01); *G06F 16/951* (2019.01); *G10L 15/183* (2013.01); *G10L 15/22* (2013.01); *H04L 43/04* (2013.01)

(58) Field of Classification Search
CPC ............. H03F 3/2173; H03F 2200/351; H03F 1/0205; H03F 3/45273; H03F 2200/393; H03F 2200/18; H03F 2200/294; H03F 2200/72; H03F 3/45995; H03F 1/303; H04R 3/007; H03K 17/0822; G11C 27/02
See application file for complete search history.

(56) References Cited

U.S. PATENT DOCUMENTS

| | | | |
|---|---|---|---|
| 7,725,321 B2 * | 5/2010 | Bennett | G06F 17/27 704/257 |
| 7,865,578 B1 * | 1/2011 | Gerraty | H04L 12/40013 709/220 |
| 9,569,950 B1 * | 2/2017 | Will | H04M 3/493 |
| 9,575,963 B2 * | 2/2017 | Pasupalak | G06F 17/27 |
| 9,767,796 B2 * | 9/2017 | Zhang | G10L 15/22 |
| 9,900,438 B1 * | 2/2018 | Hollenberg | G10L 15/22 |
| 10,127,908 B1 * | 11/2018 | Deller | G10L 15/22 |

(Continued)

*Primary Examiner* — Mohammad K Islam
(74) *Attorney, Agent, or Firm* — North Shore Patents, P.C.; Michele Liu Baillie

(57) ABSTRACT

A network monitor system collects log entries from network appliances in the data network, each log entry includes a quantity context, a first time context, a first name context, and a value of the quantity context. The network monitor system receives a spoken question inputting by a user and processes the spoken question to determine a question context in the spoken question. The question context includes a second name context, a second time context, and a quantity entity context. The network monitor system compares the question context with one or more given log entries. For each match, the network monitor system stores the quantity context and the value of the quantity context in the given log entry as a result entry in a result entries list. The network monitor system composes a response according to the result entries and outputs the response for playing to the user.

27 Claims, 12 Drawing Sheets

(56) References Cited

U.S. PATENT DOCUMENTS

| | | | | |
|---|---|---|---|---|
| 10,148,533 B1* | 12/2018 | Hull | .................... | H04L 43/0864 |
| 2004/0006478 A1* | 1/2004 | Alpdemir | ............... | G06Q 30/02 |
| | | | | 704/275 |
| 2005/0086049 A1* | 4/2005 | Bennett | ................... | G06F 17/27 |
| | | | | 704/4 |
| 2008/0039122 A1* | 2/2008 | Coelho | ................... | H04W 4/14 |
| | | | | 455/466 |
| 2008/0104542 A1* | 5/2008 | Cohen | ................... | G06F 16/951 |
| | | | | 715/810 |
| 2009/0013007 A1* | 1/2009 | Caner | ................ | H04L 41/0631 |
| 2009/0099901 A1* | 4/2009 | Sah | ........................ | G06Q 30/02 |
| | | | | 715/209 |
| 2009/0142742 A1* | 6/2009 | Goldberg | ................ | G09B 7/02 |
| | | | | 434/362 |
| 2010/0017299 A1* | 1/2010 | Pirani | .................... | G06Q 30/02 |
| | | | | 705/26.1 |
| 2010/0057586 A1* | 3/2010 | Chow | .................... | G01S 19/14 |
| | | | | 705/26.1 |
| 2011/0112869 A1* | 5/2011 | Greak | ................... | G06Q 30/06 |
| | | | | 705/4 |
| 2013/0173258 A1* | 7/2013 | Liu | ..................... | G06F 17/2217 |
| | | | | 704/9 |
| 2014/0188477 A1* | 7/2014 | Zhang | .................... | G10L 15/22 |
| | | | | 704/257 |
| 2014/0188478 A1* | 7/2014 | Zhang | .................... | G10L 15/22 |
| | | | | 704/257 |
| 2015/0370852 A1* | 12/2015 | Shastry | ................ | G06F 16/283 |
| | | | | 707/722 |
| 2016/0134495 A1* | 5/2016 | Banescu | ................ | H04L 43/04 |
| | | | | 709/224 |
| 2016/0343371 A1* | 11/2016 | Sharifi | .................... | G10L 15/08 |
| 2016/0352589 A1* | 12/2016 | Zhu | ...................... | H04L 43/04 |
| 2016/0380849 A1* | 12/2016 | Kawamori | ............ | G06Q 10/10 |
| | | | | 709/224 |
| 2017/0091779 A1* | 3/2017 | Johnson | ............... | G06Q 30/016 |
| 2017/0206903 A1* | 7/2017 | Kim | ....................... | G10L 15/02 |
| 2017/0374502 A1* | 12/2017 | Gabel | ............... | H04W 12/0609 |
| 2018/0288075 A1* | 10/2018 | Yamane | ................... | G06F 21/55 |
| 2018/0309637 A1* | 10/2018 | Gill | ........................ | H04L 67/36 |
| 2018/0329993 A1* | 11/2018 | Bedadala | ............... | G10L 15/22 |

* cited by examiner

VOICE-BASED INTERACTIVE NETWORK MONITOR

BACKGROUND OF THE INVENTION

Field

This invention relates generally to a computing network monitor system, and more specifically to the reduction of computing resources required by a network monitor system to allow for real-time voice-based interaction with a user.

Related Art

A network administrator or engineer usually spends most of a work day staring at the monitor watching status of network equipment or network traffic route flashing on the screen. When a warning status flashes on the screen, the network administrator types on the keyboard issuing various commands to examine more detail information regarding the warning. Despite the availability of improved data and network management tools for monitoring the data network, the interaction with the network monitor system is limited to entry of keyed commands.

Despite advancements in voice recognition computing technologies, real-time voice-based interactions between a user and the network monitor system remains challenging. The amount of data that must be collected and analyzed by the network monitor system requires significant network resources, including central processing unit (CPU) cycles, memory, bandwidth, etc. This makes the production of real-time responses to a voice-inputted questions impractical.

Thus, there is a need for a reduction in required network resources in the collection and analysis of network monitoring data in order to produce real-time answers to voice-inputted questions concerning a status of a computing network.

BRIEF SUMMARY OF THE INVENTION

Disclosed herein is a method for providing a voice-based real-time interactive network monitoring of network appliances in a data network and a corresponding system and a computer program product as specified in the independent claims. Embodiments of the present invention are given in the dependent claims. Embodiments of the present invention can be freely combined with each other if they are not mutually exclusive.

According to one embodiment of the present invention, a network monitor system collects a plurality of log entries from a plurality of network appliances in the data network, each log entry including a quantity context, a first time context, a first name context, and a value of the quantity context. The network monitor system receives, from an interactive speaker, first audio signals of a spoken question inputting by a user and processes the audio signals. In processing the audio signals, the network monitor system determines an ordering term and a question context included in the spoken question, where the question context includes a second name context, a second time context, and a quantity entity context. The network monitor system compares the question context with one or more given log entries, and for each given log entry matching the question context, stores the quantity context and the value of the quantity context in the given log entry as a result entry in a result entries list. The network monitor system then orders the result entries on the result entries list according to the ordering term and a pre-determined number of results and composes a response according to the ordering result entries. The network monitor system converts the response to second audio signals and outputs the second audio signals to the interactive speaker for playing to the user.

In one aspect, each log entry provides a snapshot of an activity or resource usage as indicated by the quantity context, at a time indicated by the time context, and by a network appliance of the plurality of network appliances with an identity indicated in the name context. The network monitor system compares the first name context in a given log entry with the second name context, compares the first time context in the given log entry with the second time context, and compares the quantity context in the given log entry with the quantity entity context.

In one aspect, the quantity context in each log entry includes a first system context, a first interface context, a first protocol context, or a first network application context. The quantity entity context in the question context comprises a second system context, a second interface context, a second protocol context, or a second network application context.

In one aspect, the first system context indicates a source of the activity or the resource usage, the first interface context indicates an interface of the source involved in the activity or the resource usage, the first protocol context indicates a protocol used by the source in the activity or the resource usage, and the first network application context indicates a network application involved in the activity or the resource usage. The second system context indicates a source of the activity or the resource usage corresponding to the spoken question, the second interface context indicates an interface corresponding to the spoken question, the second protocol context indicates a protocol corresponding to the spoken question, and the second network application context indicates a network application corresponding to the spoken question.

In one aspect, the network monitor system compares a first system context in the quantity context with a second system context in the quantity entity context. When the quantity entity context includes the second interface context, the network monitor system compares the first interface context in the quantity context with the second interface context in the quantity entity context. When the quantity entity context includes the second protocol context, the network monitor system compares the first protocol context in the quantity context with the second protocol context in the quantity entity context. When the quantity entity context includes the second network application context, the network monitor system compares the first network application context in the quantity context with the second network application context in the quantity entity context.

In one aspect, the network monitor system determines that, for the quantity context in the given log entry matching the question context, a result entry with a same quantity context exists in the result entries list. The network monitor system combines the value of the quantity context in the given log entry to a value in the existing result entry.

In one aspect, the network monitor system determines one or more words included in the spoken question. The network monitor system compares the one or more words included in the spoken question with a main dictionary and a name dictionary, the main dictionary including a plurality of ordering words and a plurality of context words associated with a plurality of contexts, the name dictionary including a plurality of identities corresponding to contexts of the plurality of network appliances. Upon finding a match between the one or more words included in the spoken question and a given context word of the plurality of context words in the main dictionary, the network monitor system stores the given context word and the context associated with the given context word in the quantity entity context. Upon finding a match between the one or more words included in the spoken question with a given ordering word in the main dictionary, the network monitor system identifies the given ordering word as the ordering term. Upon finding a match between the one or more words comprised in the spoken question with a given identity in the name dictionary, the network monitor system stores the given identity in the second name context.

In one aspect, the network monitor system compares the one or more words included in the spoken question with an auxiliary dictionary, the auxiliary dictionary including a plurality of words linked to one or more words in the main dictionary. Upon finding a match between the one or more words comprised in the spoken question and a given word in the auxiliary dictionary, the network monitor system stores the given word in the auxiliary dictionary and the one or more words in the main dictionary linked to the given word in the auxiliary dictionary in the quantity entity context.

In one aspect, the name dictionary further includes a plurality of group names linked to a plurality of names in the name dictionary. Upon finding a match between the one or more words included in the spoken question with a given group name in the name dictionary, the network monitor system stores the given group name and the plurality of names linked to the given group name in the second name context.

In one aspect, the network monitor system orders the result entries on the result entries list according to the ordering term until either the pre-determined number of results are generated or a pre-determined time limit is reached.

DETAILED DESCRIPTION OF THE INVENTION

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Reference in this specification to "one embodiment", "an embodiment", "an exemplary embodiment", or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

Figure 1:
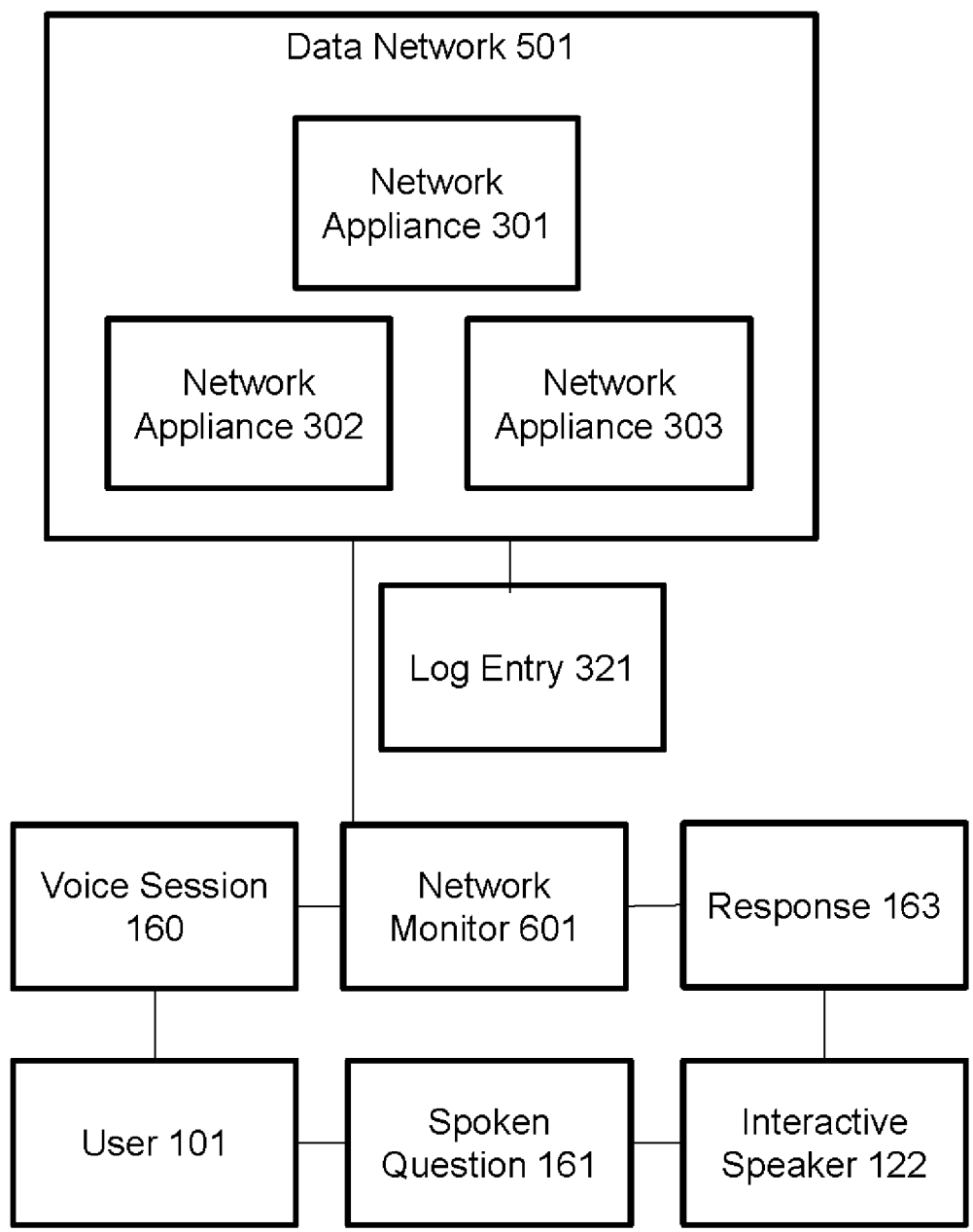
FIG. 1 illustrates an exemplary embodiment of a network monitor system conducting an interactive voice session with a user.

FIG. 1 illustrates an exemplary embodiment of a network monitor system conducting an interactive voice session with a user. In one embodiment, network monitor 601 connects, via a data network 501, to a plurality of network appliances such as network appliance 301, network appliance 302, and network appliance 303. In one embodiment, network monitor 601 receives one or more log entries such as log entry 321 from the plurality of network appliances. Network monitor 601 stores log entry 321, and uses log entry 321 to generate an answer to a spoken question 161 from user 101.

In one embodiment, user 101 interactively participates in a voice session 160 between an interactive speaker 122 and a network monitor 601. The user 101 inputs a spoken question 161 into the interactive speaker 122. Network monitor 601 receives audio signals of the spoken question 161 and generates an audio response 163 using log entry 321. Network monitor 601 then outputs the response 163 to the interactive speaker 122, which can then be played for user 101.

In one embodiment, network appliance 301 can be a network switch, an Ethernet switch, an optical network switch, a storage switch, a voice switch, a router, an IP router, a network gateway, a service gateway, a security gateway, a broadband gateway, a firewall, a remote access gateway, a mobile service node, a radio access node, a wireless access base station, a cellular base station, a server load balancer, an application delivery controller, a software-defined network (SDN) network device, a media gateway, a content cache server, a wide-area network (WAN) optimizer, a wireless signal amplifier, an application-layer proxy gateway, or a network device relaying network traffic from a network interface to another network interface.

In one embodiment, data network 501 includes a cellular network, a mobile data network, a WiFi network, a LiFi network, a WiMAX network, an Ethernet, or any other data network.

In one embodiment, log entry 321 stores information about an event reported by any of the network appliances 301-303 regarding a resource activity or measurement, a network event, an alert, or a debugging event.

In one embodiment, user 101 is a network administrator, a network operator, a network engineer, a manager, a field operator, a laboratory technician, a customer support person, a software engineer, a customer, or an end user.

In one embodiment, voice session 160 is a voice-based conversational communication session between the interactive speaker 122 and the network monitor 601, where user 101 inputs voice-based questions into interactive speaker 122 and listens to audio response 163 output from interactive speaker 122. In one embodiment, interactive speaker 122 includes an attached or connected, wired or wirelessly, microphone. Interactive speaker 122 may be a headphone, a headset, or a standalone computing device connected to one or more speakers and one or more microphones. Interactive speaker 122 may be a wearable device, a head-mounted device, embedded in a vehicle, a display or monitor, a television set, or a stand. In one embodiment, interactive speaker 122 receives a piece of text included in the response 163 and translates the text into speech or a plurality of audio signals.

In one embodiment, response 163 includes an audio clip, a plurality of audio signals, or a piece of text or data to be translated or converted to speech or audio signals. In one embodiment, response 163 includes a URL link where an audio clip, a plurality of audio signals, or a piece of text or date is to be retrieved from the URL.

In one embodiment, network monitor 601 includes a computing device. In one embodiment, network monitor 601 includes an audio signal processing module to analyze audio signals from spoken question 161. In one embodiment, network monitor 601 includes an audio signal or voice/speech processing module to generate response 163.

Figure 2:
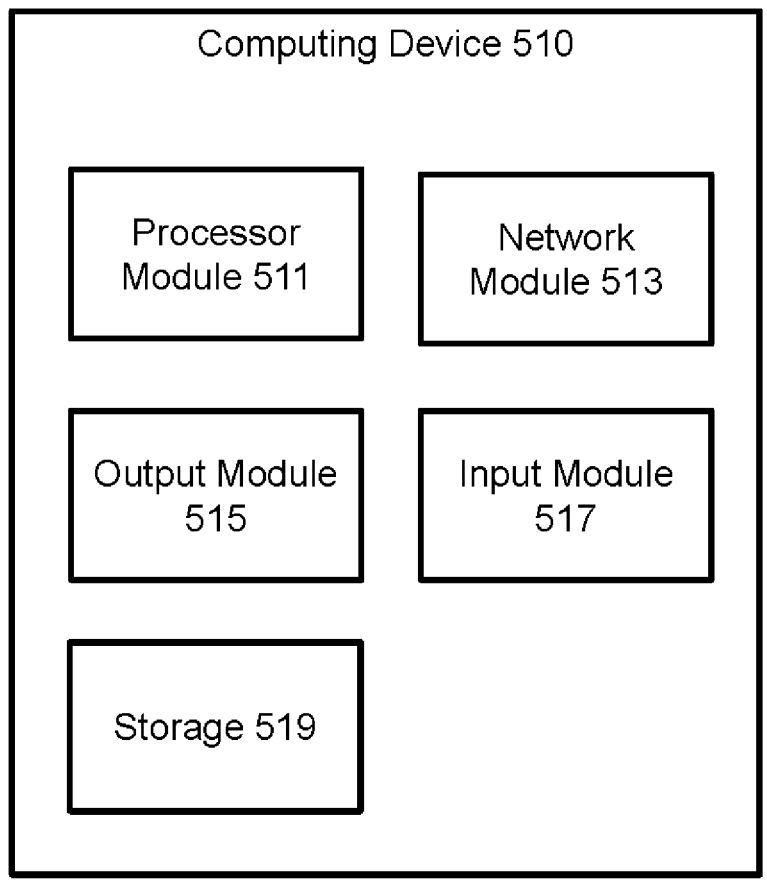
FIG. 2 illustrates an exemplary embodiment of hardware components of a computing device.

FIG. 2 illustrates an exemplary embodiment of hardware components of a computing device which can be used for a network appliance, a network monitor, a network computer or an interactive speaker. In one embodiment, computing device 510 includes a processor module 511, a network module, an output module 515, an input module 517, and a storage module 519. In one embodiment, processor module 511 includes one or more general processors, a multi-core processor, an application specific integrated circuit based processor, a system on a chip (SOC) processor, an embedded processor, a digital signal processor, or a hardware- or application-specific processor. In one embodiment, output module 515 includes or connects to a display for displaying video signals, images or text, one or more speakers to play sound signals, or a lighting module such as an LED. In one embodiment, output module 515 includes a data interface such as USB, HDMI, DVI, DisplayPort, thunderbolt or a wire-cable connecting to a display, or one or more speakers. In one embodiment, output module 515 connects to a display or a speaker using a wireless connection or a wireless data network. In one embodiment, input module 517 includes a physical or logical keyboard, one or more buttons, one or more keys, or one or more microphones. In one embodiment, input module 517 includes or connects to one or more sensors such as a camera sensor, an optical sensor, a night-vision sensor, an infrared (IR) sensor, a motion sensor, a direction sensor, a proximity sensor, a gesture sensor, or other sensors that is usable by a user to provide input to computing device 510. In one embodiment, input module 517 includes a physical panel housing for one or more sensors. In one embodiment, storage 519 includes a storage medium, a main memory, a hard disk drive (HDD), a solid state drive (SSD), a memory card, a ROM module, a RAM module, a USB disk, a storage compartment, a data storage component or other storage component. In one embodiment, network module 513 includes hardware and software to interface or connect to a wireless data network such as a cellular network, a mobile network, a Bluetooth network, a NFC network, a personal area network (PAN), a WiFi network, or a Li-Fi network. Storage 519 includes executable instructions when read and executed by the processor module 511 of computing device 510 implement one or more functionality of the current invention.

Figure 3:
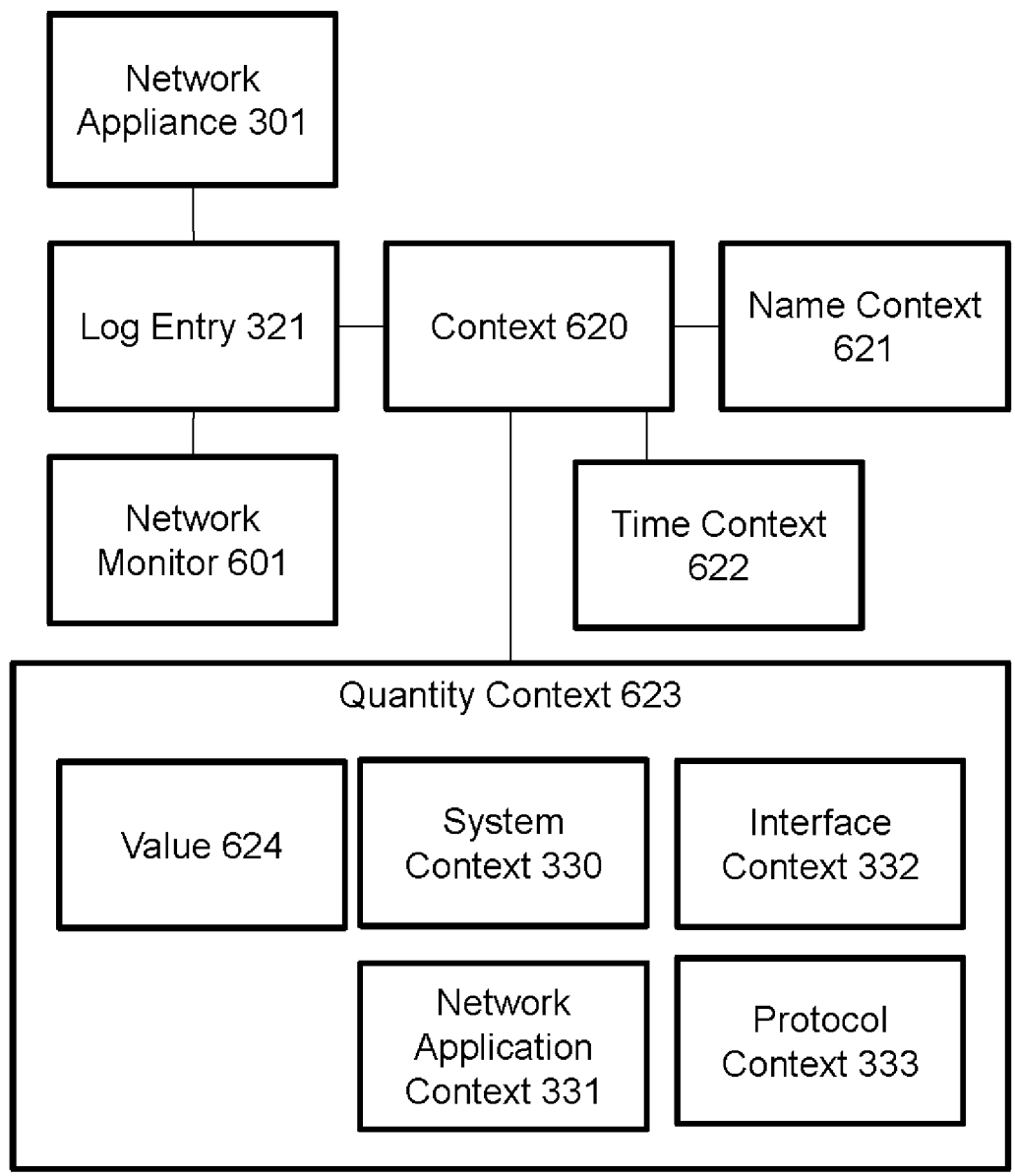
FIG. 3 illustrates an exemplary embodiment of collecting a log entry of a network appliance by network monitor.

FIG. 3 illustrates an exemplary embodiment of collecting a log entry of a network appliance by network monitor. In one embodiment, network appliance 301 sends log entry 321 to network monitor 601. Log entry 321 includes information regarding usage of network or system resources of network appliance 301. In one embodiment, log entry 321 includes one or more contexts 620 representing one or more sets of circumstances or facts related to a piece of data stored in the log entry 321. Context 620 can be a name context 621, a time context 622 or a quantity context 623. Name context 621 includes a name or an identity of network appliance 301, for example, "Switch 5609", "ID4017C5AB9", "North West Seattle 67", "South Gate Router", or "Rockefeller Center Broadband Gateway". In one embodiment, name context 621 is unique to network appliance 301 and is different from that of other network appliances. In one embodiment, time context 622 includes a time, a timestamp, or a time duration, such as "01/10/2018, 15:45:32.09", "05/21/17, morning", or "05/24/17 10:00-10:01". In one embodiment, time context 622 indicates a time when log entry 321 is sent by network appliance 301, is created by network appliance 301, or when quantity context 623 is recorded.

In one embodiment, quantity context 623 includes a value 624 associated with an activity or resource usage such as a system context 330 indicating a source of the activity or the resource usage, an interface context 331 indicating an interface of the source involved in the activity or the resource usage, protocol context 332 indicating a protocol used by the source in the activity or the resource usage, or a network application context 333 indicating a network application involved in the activity or the resource usage. In one embodiment, quantity context 623 includes an interface context 332, such as "interface 5", and value 624 of "23 Mbps" to indicate a measured or recorded usage of interface 5 is 23 Mbps. In one embodiment, quantity context 623 includes a system context 330, such as "CPU", and value 624 of "23%" to indicate a record usage of 23% of CPU. In one embodiment, system context 330 indicates memory usage, storage usage or other system usage. In one embodiment, quantity context 623 includes a protocol context 333, such as "IP", and value 624 of "1904507 packets" to indicate a measured usage of 1904507 IP packets. In one embodiment, protocol context 333 can be "TCP", "HTTP", Secure TCP", "SSL", "SIP", "Ethernet", or other data communication protocols. In one embodiment, quantity context 623 includes a network application context 331, such as "SSL Proxy", with value 624 of "4819 sessions" to indicate a recorded 4819 active sessions for SSL Proxy application. In one embodiment, network application context 331 can be "TCP Proxy", "Server Load Balancing", "DDOS Protection", "Content Caching", or another network application resided in network appliance 301.

In one embodiment, the contexts in the log entry 321 records a snapshot of activity or resource usage indicated by quantity context 623, at a time indicated by time context 622, by network appliance 301 with an identity indicated in name context 621.

Figure 4:
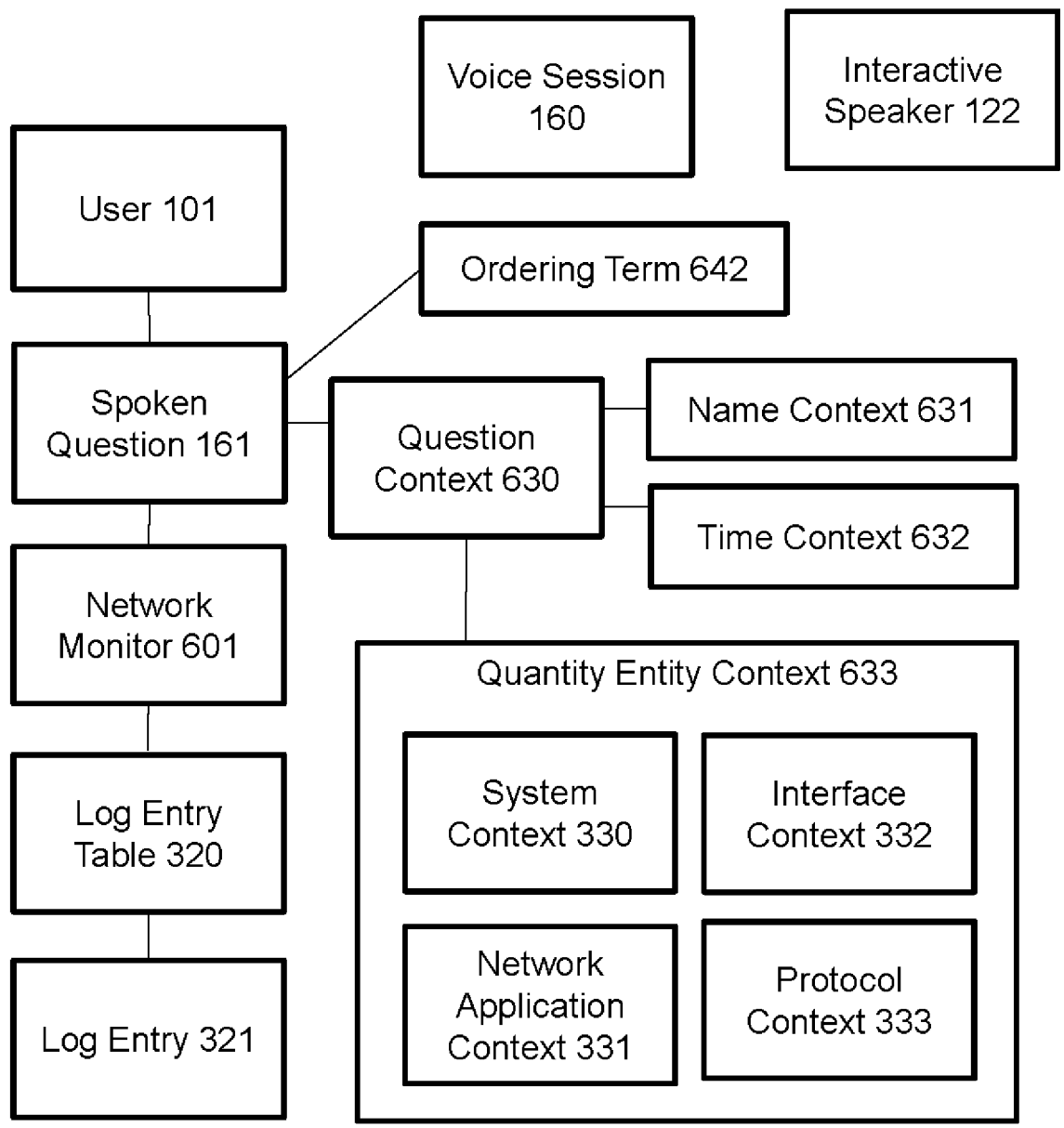
FIG. 4 illustrates an exemplary embodiment of receiving a spoken question from a user by network monitor.

FIG. 4 illustrates an exemplary embodiment of receiving a spoken question from a user by network monitor. In one embodiment, a voice session 160 is established between interactive speaker 122 and network monitor 601. During voice session 160, user 101 inputs a spoken question 161 into interactive speaker 122, which captures the spoken question 161 as audio signals. In one embodiment, interactive speaker 122 captures the audio signals corresponding to spoken question 161 and sends the captured audio signals to network monitor 601, where the network monitor 601 analyzes the audio signals of spoken question 161 using natural language processing to determine a combination of ordering term 642 and one or more question context 630 contained in the spoken question 161. List 1 below illustrates example spoken questions 161.

List 1. Spoken Questions
- Which were the most active switches yesterday?
- Tell me the most active network applications this morning.
- What are the most used network interface in Switch-1645?
- How many VoIP sessions were there in the past hour?
- Which were the most visited Websites last month?
- How busy was the North East Regional Network last week?
- Which switch has the top CPU usage?

In one embodiment, question context 630 includes a name context 631 which identifies a network appliance or refers to a group of network appliances. In one embodiment, the audio signals in spoken question 161 do not match any of the audio signals corresponding to a network appliance in the data network 501, and as a default, a pre-determined name context 631 referring to all network appliances in the data network 501 is selected for spoken question 161. In one embodiment, one or more pre-determined network appliances is used as a default name context 631 for spoken question 161.

In one embodiment, question context 630 includes a time context 632, which specifies a time, a time range, a time duration, or a time references. Time context 632 can be "this morning", "yesterday", "past hour", "last week", "last month", "8 to 12 o'clock this morning", "last Sunday 4 to 8 in the afternoon", "4 to 5 am yesterday morning", or "past 10 minutes". In one embodiment, spoken question 161 does not include a time context, and as a default, a pre-determined time context 632 is selected for spoken question 161. The pre-determined time context 632 can be the past hour, the last 15 minutes, the most recent hour prior to current time, or the morning of the day.

In one embodiment, question context 630 includes a quantity entity context 633, which may be a system context, an interface context, a protocol context or a network application. In one embodiment, spoken question 161 does not include any quantity entity context, and as a default, a pre-determined quantity entity context 633 is selected as the quantity entity context for spoken question 161. Pre-determined quantity entity context can be "CPU", "interface", or a pre-determined network application.

Using List 1 for illustration, in one embodiment, spoken question 161 is "How many VoIP sessions were there in past hour?" In this embodiment, the question context 630 is determined to include two phrases, "VoIP sessions" and "past hour", by the network monitor 601. "Past hour" is determined to be a time context. "VoIP" is determined to be a network application context. In one embodiment, spoken question 161 is "What are the most used network interface in Switch-1645". In this embodiment, "Switch-1645" is determined to be a name context, "past hour" is determined to be the pre-determined time context, and "interface" is determined to be a quantity entity context including an interface context.

Upon determining the one or more question contexts 630 of spoken question 161, network monitor 601 matches question context 630 against a log entry table 320 containing one or more log entries. In one embodiment, network monitor 601 compares log entry 321 of log entry table 320 with question context 630, and if there is a match, selects log entry 321.

Figure 5:
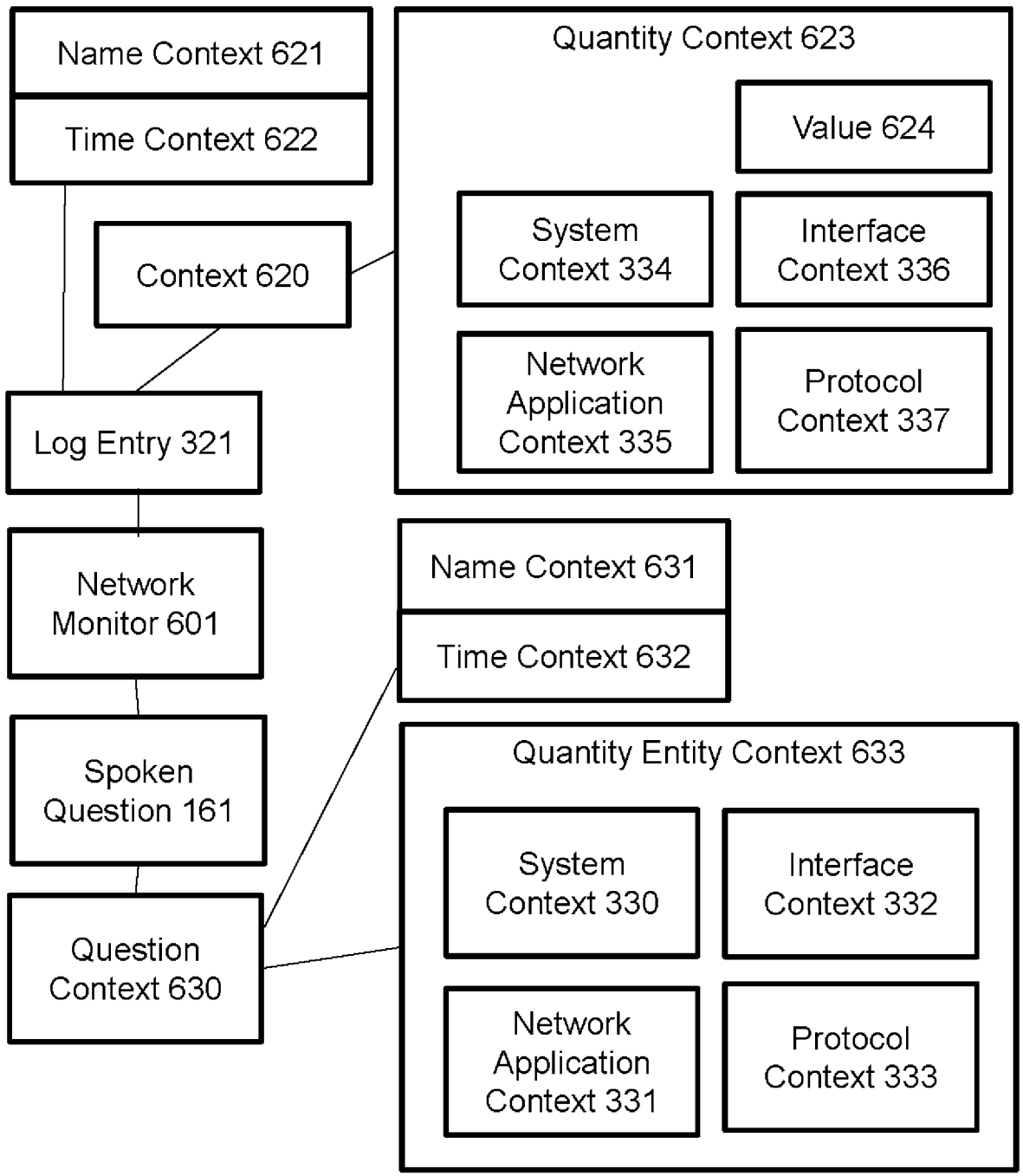
FIG. 5 illustrates an exemplary embodiment of matching a log entry with a question context by network monitor.

FIG. 5 illustrates an exemplary embodiment of matching a log entry with a question context by network monitor. In one embodiment, network monitor 601 matches log entry 321 with one or more question context 630 of spoken question 161. In one embodiment, log entry 321 includes a name context 621, a time context 622 and one or more contexts 334-337 are in quantity context 623. In one embodiment, the one or more question contexts 630 includes a name context 631, a time context 632, and one or more quantity entity context 633. In one embodiment, network monitor 601 determines log entry 321 matches the question context 630 when name context 621 matches name context 631, time context 622 matches time context 632, and the contexts 334-337 in quantity context 623 matches the contexts 330-333 in quantity entity context 633.

In one embodiment, network monitor 601 matches name context 631 with name context 622. In one embodiment, name context 631, for example "Switch 1245" and name context 621, for example "Switch 1245", are the same, and the network monitor 601 is configured to determine that there is match. In one embodiment, name context 631 refers a group of network appliances, such as "router" or "any router", and name context 621 is associated with the group of network appliances, such as "New York City Router 241", and the network monitor 601 is configured to determine that there is a match. In one embodiment, name context 631 refers to a group of "routers" and name context 621 indicates "Application Delivery Controller 624", and the network monitor 601 is configured to determine that there is no match. In one embodiment, name context 631 is a sub-name or sub-identity, for example "Switch-12", of name context 621, for example "Switch-1245", and the network monitor 601 is configured to determine that there is a match.

In one embodiment, network monitor 601 matches time context 632 with time context 622. In one embodiment, time context 622 is a timestamp, for example "5/12/2017 10:07: 32", within a time range or duration of time context 632, for example 5/12/2017 8:00:00-12:00:00", and the network monitor 601 is configured to determine that there is a match. In one embodiment, time context 632 includes a time reference, such as "this morning", and time context 622 is a timestamp within 6 am to 12 pm of the day, and the network monitor 601 is configured to determine that there is a match. In one embodiment, time context 632 includes a time reference, such as "last night", and time context 622 is a time referencing to between 6 am to 12 pm of the previous day, and the network monitor 601 is configured to determine that there is no match.

In one embodiment, network monitor 601 matches a quantity entity context 633 with a quantity context 623. In one embodiment, quantity entity context 633 includes a system context 330. Quantity context 623 matches quantity entity context 633 when quantity context 623 is defined as corresponding to quantity entity context 633, although they are not the same. In one embodiment, quantity entity context 623 includes a system context 334 of "CPU", and quantity context 633 includes a system context 330 of "CPU", and the network monitor 601 is configured to determine that they match. In one embodiment, quantity entity context 623 includes a system context 334 of "memory", and quantity context 633 includes a system context 334 of "memory", and the network monitor 601 is configured to determine that they match. In one embodiment, quantity entity context 623 includes a system context 334 of "CPU", and quantity context 633 includes a system context 330 of "memory", and the network monitor 601 is configured to determine that they do not match.

In one embodiment, quantity entity context 633 includes an interface context 332. Quantity context 623 matches quantity entity context 633 when interface context 336 in quantity context 623 is defined as corresponding to interface context 332 in quantity entity context 633. In one embodiment, interface context 332 indicates "interface 3", and interface context 336 indicates "interface 3", and network monitor 601 is configured to determine that they match. In one embodiment, interface context 332 indicates "interface 3", and interface context 336 indicates "interface 3.2", and network monitor 601 is configured to determine that they match. In one embodiment, interface content 332 indicates "interface 3" or "Ethernet interface 3", and interface context 336 indicates a sub interface 3.2, a virtual interface 3.4 of interface 3, a VLAN identity 267 of interface 3, and network monitor 601 is configured to determine that they match. In one embodiment, interface context 332 indicates "interface 3", and interface context 336 indicates "interface 5" or "interface 5/1", and network monitor 601 is configured to determine that they do not match. In one embodiment, interface context 332 indicates a group of interfaces, such as "Ethernet interface", and interface context 336 indicates "interface 3 Ethernet", and network monitor 601 is configured to determine that they match. In one embodiment, interface context 332 indicates a group of interfaces, such as "Ethernet interface" and interface context 336 indicates "interface 3 ATM", and network monitor 601 is configured to determine that they do not match. In one embodiment, interface context 332 indicates a group of interfaces, such as "interface", and interface context 336 indicates "interface 4" or "interface 3/1", and network monitor 601 is configured to determine that they match.

In one embodiment, quantity entity context 633 includes a protocol context 333. Quantity context 623 matches quantity entity context 633 when protocol context 337 in quantity context 623 is defined as corresponding to protocol context 333 in quantity entity context 633. In one embodiment, protocol context 333 indicates "IP", and protocol context 337 indicates "IP", and network monitor 601 is configured to determine that they match. In one embodiment, protocol context 333 indicates "IP", and protocol context 337 indicates "TCP", and network monitor 601 is configured to determine that they do not match. In one embodiment, protocol context 333 indicates "HTTP", and protocol context 337 indicates "HTTP", and network monitor 601 is configured to determine that they match. In one embodiment, protocol context 333 indicates "HTTP", and protocol context 337 indicates "HTTPS", and network monitor 601 is configured to determine that they match. In one embodiment, protocol context 333 indicates "Link Layer Protocol", and protocol context 337 indicates "Ethernet", and network monitor 601 is configured to determine that they match. In one embodiment, protocol context 333 indicates "Link Layer Protocol", and protocol context 337 indicates "IP" or "SIP", and network monitor 601 is configured to determine that they do not match.

In one embodiment, quantity entity context 633 includes a network application context 331. Quantity context 623 matches quantity entity context 633 when network application context 335 in quantity context 623 is defined as corresponding to network application context 331 in quantity entity context 633. In one embodiment, network application context 335 indicates "TCP Proxy", and network application context 331 indicates "TCP Proxy", and network monitor 601 is configured to determine that they match. In one embodiment, network application context 335 indicates "TCP Proxy", and network application context 331 indicates "HTTP Proxy", and network monitor 601 is configured to determine that they do not match. In one embodiment, network application context 335 indicates "DDOS Protection", and network application context 331 indicates "DDOS Protection", and network monitor 601 is configured to determine that they match. In one embodiment, network application context 335 indicates a network application "Server Load Balancing", "Network Address Translation", "Virtual Private Network", "Broadband Remote Access", "Content Caching" or other network application, and network monitor 601 is configured to determine that network application context 335 matches a corresponding network application context, although they are not the same.

In one embodiment, network monitor 601 determines log entry 321 matches question context 630. Network monitor 601 matches a quantity context 623 of log entry 321 with a quantity entity context 633 of question context 630. Network monitor 601 thus selects log entry 321 and retrieves the value 624 of the quantity context 623 of log entry 321.

Figure 6:
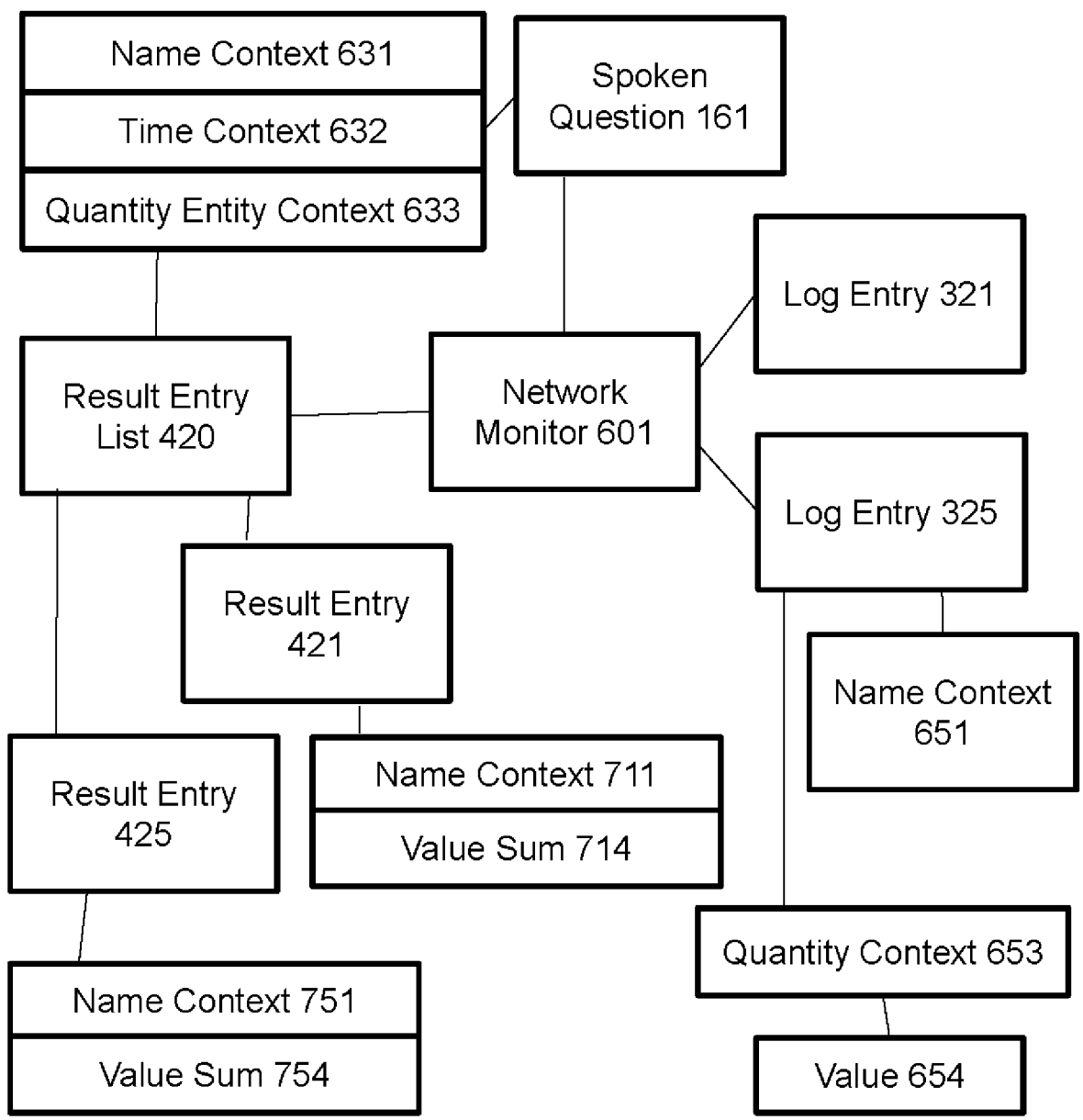
FIG. 6 illustrates an exemplary embodiment of accumulating quantity context value for a selected quantity context according to a spoken question.

FIG. 6 illustrates an exemplary embodiment of accumulating quantity context value for a selected quantity context according to a spoken question by the network monitor. In one embodiment, network monitor 601 associates name context 631, time context 632 and quantity entity context 633 to result entity list 420. Network monitor 601 stores result entries into result entry list 420 upon processing spoken question 161. In one embodiment, name context 631 indicates a plurality of network appliances or a group of network appliances. Result entry list 420 is created to store result entries matching the plurality of network appliances.

In one embodiment, network monitor 601 processes spoken question 161 and selects a matching log entry 325, as described above with reference to FIG. 5. Network monitor 601 integrates log entry 325 into result entry list 420. In one embodiment, log entry 325 includes name context 651, quantity context 653 and value 654 of quantity context 653. Network monitor 601 compares log entry 325 with result entry list 420 to determine if name context 651 in log entry 325 matches any of the result entries on the result entry list 420. In one embodiment, network monitor 601 determines that name context 651 does not match any of the result entries on result entry list 420. In one embodiment, network monitor 601 creates a result entry 425. Network monitor 601 copies name context 651 of log entry 325 to name context 751 of result entry 425, and value 654 of log entry 325 to value sum 754 of result entry 425. Network monitor 601 then stores result entry 425 into result entry list 420.

In one embodiment, network monitor 601 determines log entry 325 matches result entry 421 on the result entry list 420. In one embodiment, name context 651 of log entry 325 is the same as name context 711 of result entry 421, and network monitor 601 determines there is a match. In one embodiment, network monitor 601 updates value sum 714 of result entry 421 by adding value 654 of log entry 325 to value sum 714. In one embodiment, network monitor 601 updates value sum 714 of result entry 421 by calculating an average value when combining value 654 into value sum 714. In one embodiment, network monitor 601 replaces value sum 714 of result entry 421 by value 654 of log entry 325, for example, when log entry 325 indicates a more recent time context than log entries integrated previously into result entry 425.

In one embodiment, network monitor 601 integrates other log entries with matching name contexts, such as log entry 321, into result entry list 420.

Figure 7:
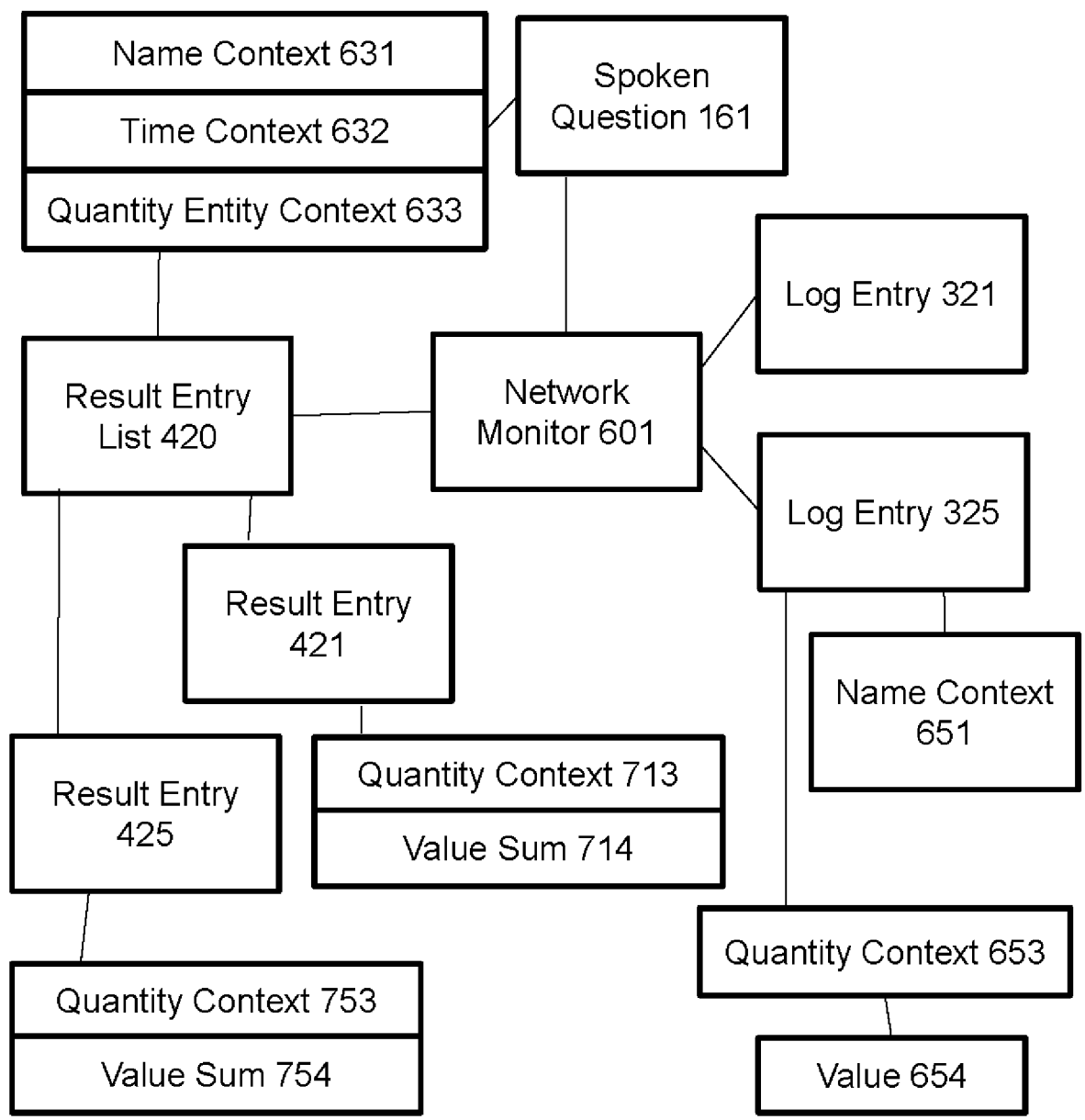
FIG. 7 illustrates an exemplary embodiment generating a result entry list containing one or more result entries by the network monitor.

FIG. 7 illustrates an exemplary embodiment generating a result entry list containing one or more result entries by the network monitor. In one embodiment, network monitor 601 creates a result entry list 420 while processing spoken question 161. Network monitor 601 associates name context 631, time context 632, and quantity entity context 633 to result entity list 420. Network monitor 601 stores result entries into result entry list 420 upon processing spoken question 161. In one embodiment, name context 631 indicates only one network appliance. Result entry list 420 is created to store result entries matching the network appliance having name context 631.

In one embodiment, network monitor 601 processes spoken question 161 and selects a log entry 325 with name context matching name context 631, as described above with reference to FIG. 5. Network monitor 601 integrates log entry 325 into result entry list 420. In one embodiment, log entry 325 includes name context 651, quantity context 653 and value 654 of quantity context 653. Network monitor 601 matches log entry 325 to determine whether quantity context 653 matches any result entry on the result entry list 420. In one embodiment, network monitor 601 determines that quantity context 653 does not match any of the result entries on the result entry list 420. In one embodiment, network monitor 601 creates a result entry 425. Network monitor 601 copies quantity context 653 of log entry 325 as quantity context 753 of result entry 425, and value 654 of log entry 325 as value sum 754 of result entry 425. Network monitor 601 then stores result entry 425 into result entry list 420.

In one embodiment, network monitor 601 determines there is a match between log entry 325 matches result entry 421 on result entry list 420. In one embodiment, quantity context 653 of log entry 325 is the same as quantity context 713 of result entry 421, and network monitor 601 is configured to determines that there is a match. In one embodiment, network monitor 601 updates value sum 714 of result entry 421 by adding value 654 of log entry 325 to value sum 714.

In one embodiment, network monitor 601 integrates other log entries with matching name contexts, such as log entry 321 that matches spoken question 161, into result entry list 420 in the same manner as above.

Figure 8:
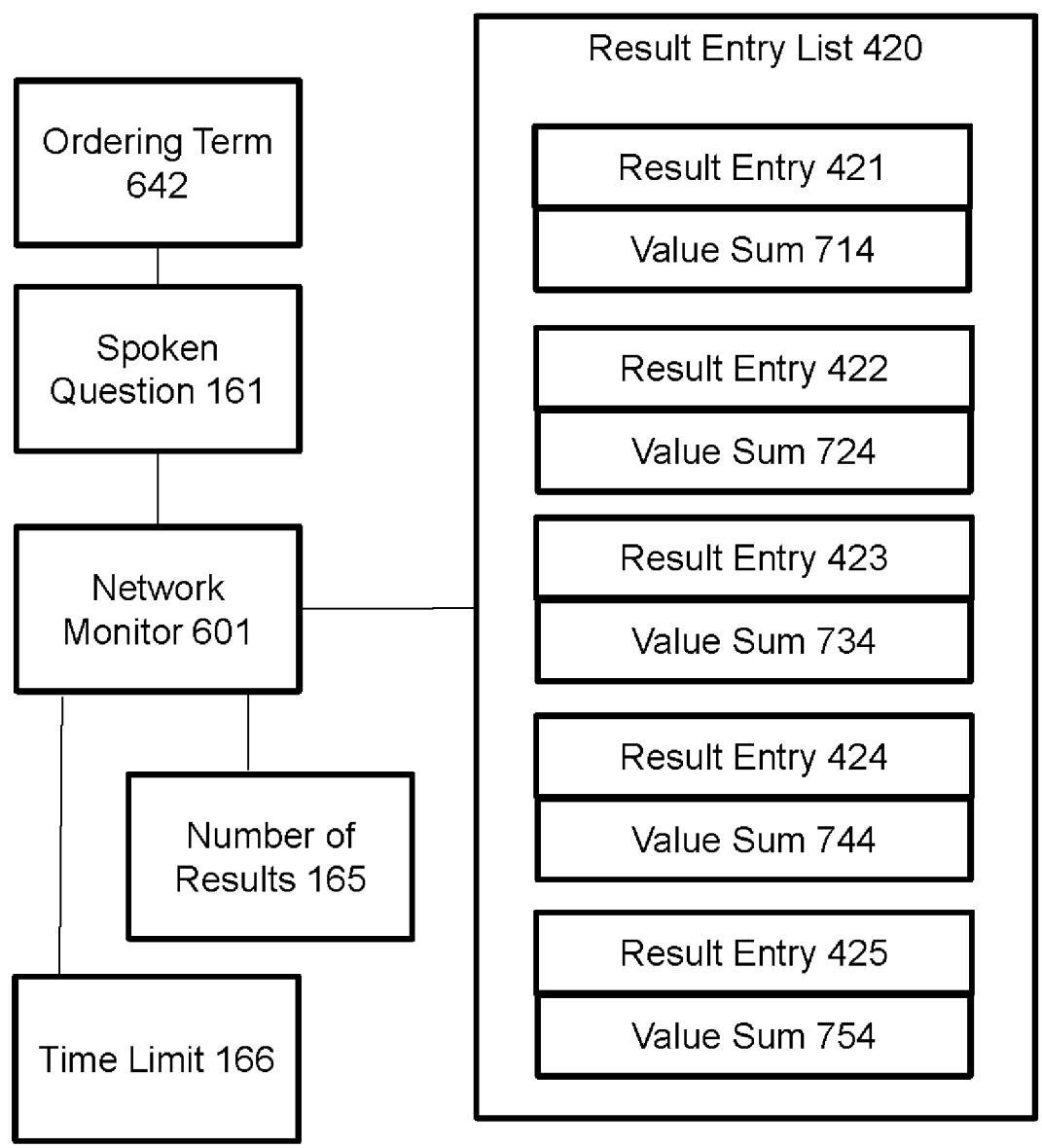
FIG. 8 illustrates an exemplary embodiment of organizing result entries according to a spoken question by network monitor.

In one embodiment, network monitor 601 further processes result entry list 420, according to FIG. 8, upon integrating matching log entries into the result entry list 420.

FIG. 8 illustrates an exemplary embodiment of organizing result entries according to a spoken question by network monitor. In one embodiment, network monitor 601 organizes result entry list 420, according to the ordering term 642 of spoken question 161. In one embodiment, ordering term 642 indicates a term containing a word, such as "top", "busy", "busiest", or "hotspot", and network monitor 601 orders result entries in result entry list 420 in descending order of value sum of the result entries. In one embodiment, result entry list 420 contains result entry 421 with value sum 714, result entry 422 with value sum 724, result entry 423 with value sum 734, result entry 424 with value sum 744, and result entry 425 with value sum 754. Network monitor 601 sorts value sum 714-754 in descending order, and updates the storing of result entries in result entry list 420 so that value sum 714 is no less than value sum 724, which is no less than value sum 734, which is no less than value sum 744, which is no less than value sum 745.

In one embodiment, ordering term 642 indicates a term containing words "least busy", "most idle", or "least used". Network monitor 601 orders result entries in result entry list 420 in ascending order of value sum of the results entries. In one embodiment, network monitor 601 sorts value sum 714-754 in ascending order, and updates the storing of result entries in result entry list 420 so that value sum 714 is no larger than value sum 724, which is no larger than value sum 734, which is no larger than value sum 744, which is no larger than value sum 745.

During the ordering of result entry list 420 according to ordering term 642, network monitor 601 selects a sub-set of result entries from ordered result entry list 420, per a pre-determined or configured number of results 165. In one embodiment, number of results 165 is 3, and network monitor 601 selects the first 3 result entries 421, 422, 423 of result entry list 420. In one embodiment, the specific number in number of results 165 is configured to be associated with specific terms in ordering term 642. For example, number of results 165 of 3 may be configured for "top" in ordering term 642, while number of results 165 of 5 may be configured for "least busy" in ordering term 642. In this example, only the results that fall within the top 5 will be ordered, while results that do not fall within the top 5 are not ordered.

In one embodiment, network monitor 601 additionally includes a pre-determined time limit 166. Network monitor 601 uses time limit 166 by ordering the result entry list 420 until either the number of results 165 are generated or the time limit is reached. In one embodiment, network monitor 601 selects the sub-set of result entries before time limit 166 is reached. Network monitor 601 uses the selected number of results 165. In one embodiment, network monitor 601 selects a few number of result entries when time limit 166 is reached. Network monitor 601 uses the selected fewer number of result entries.

Figure 9:
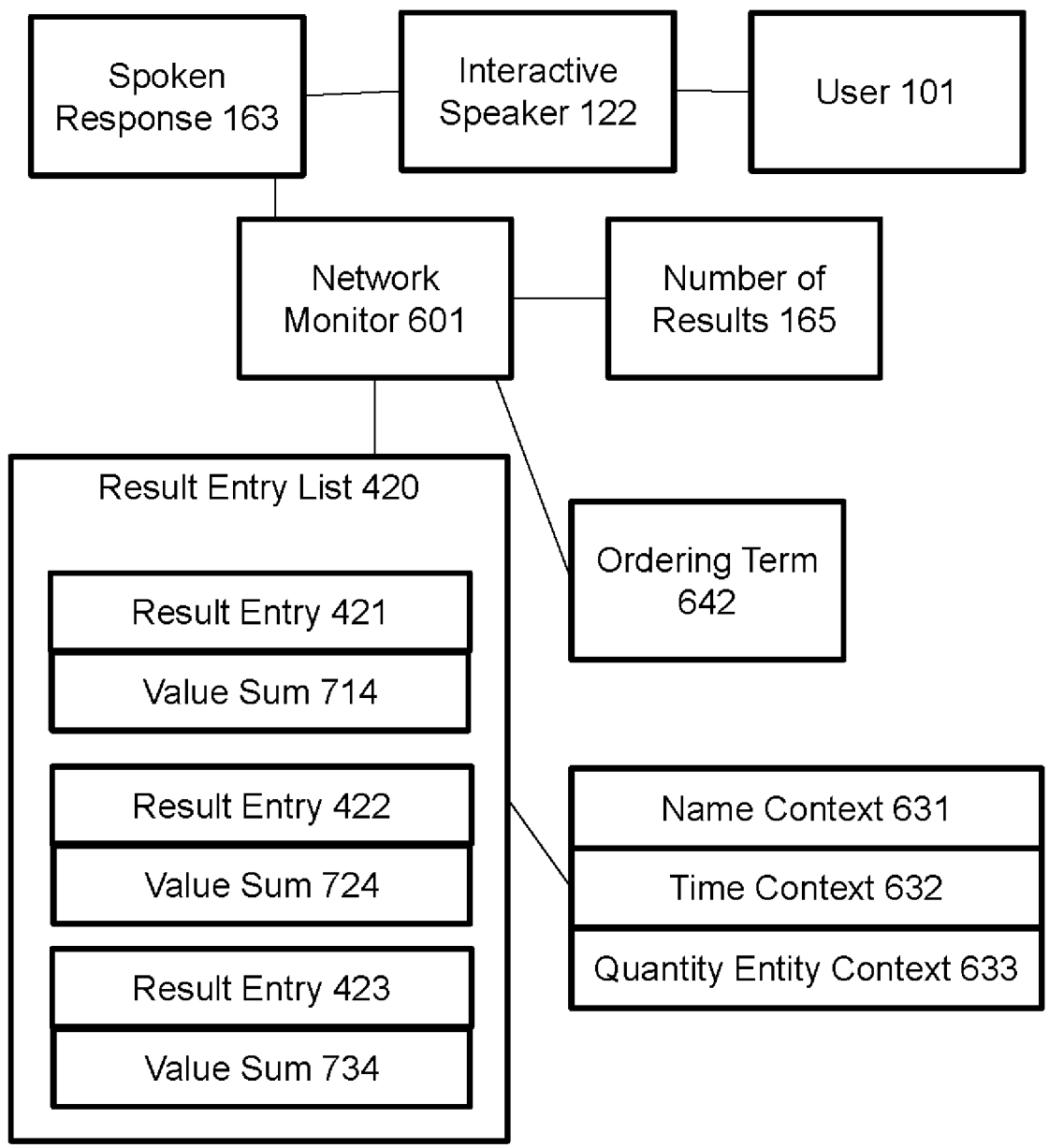
FIG. 9 illustrates an exemplary embodiment process of generating a response according to a result entry list by network monitor.

FIG. 9 illustrates an exemplary embodiment generating a response according to a result entry list by network monitor. In one embodiment, network monitor 601 selects a number of results 165 of result entries of result entry list 420. The result entry list 420, includes result entry 421, result entry 422 and result entry 423, and is associated to name context 631, time context 632 and quantity entry context 633. Network monitor 602 composes a spoken response 163 according to ordering term 642, number of results 165, and result entry list 420.

In one embodiment, ordering term 642 is "top", number of results 165 is "3", name context 631 of result entry list 420 is "switch", time context 632 of result entry 420 is "past hour" and quantity entity context is "VoIP application". Network monitor 601 composes response 163 initially as "The top 3 switches with VoIP application during the past hour are". In one embodiment network monitor 601 then adds to response 163 result entry 421, result entry 422 and result entry 423. In one embodiment, result entry 421 has a name context of "Switch Bay Area" and value sum 714 of "4591 sessions", result entry 422 has a name context of "Voice Switch Los Angeles" and value sum 724 of "3972 sessions", and result entry 423 has a name context of "Switch 810974" and value sum 734 of "3768 sessions". Network monitor 601 appends to response 163 "network appliance Switch Bay Area with 4591 sessions, network appliance Voice Switch Los Angeles with 3972 sessions, and network appliance Switch 810974 with 3768 sessions."

Upon completing the composing of spoken response 163, network monitor 601 sends response 163 to interactive speaker 122, which then plays the audio signals of spoken response 163 to user 101.

Figure 10:
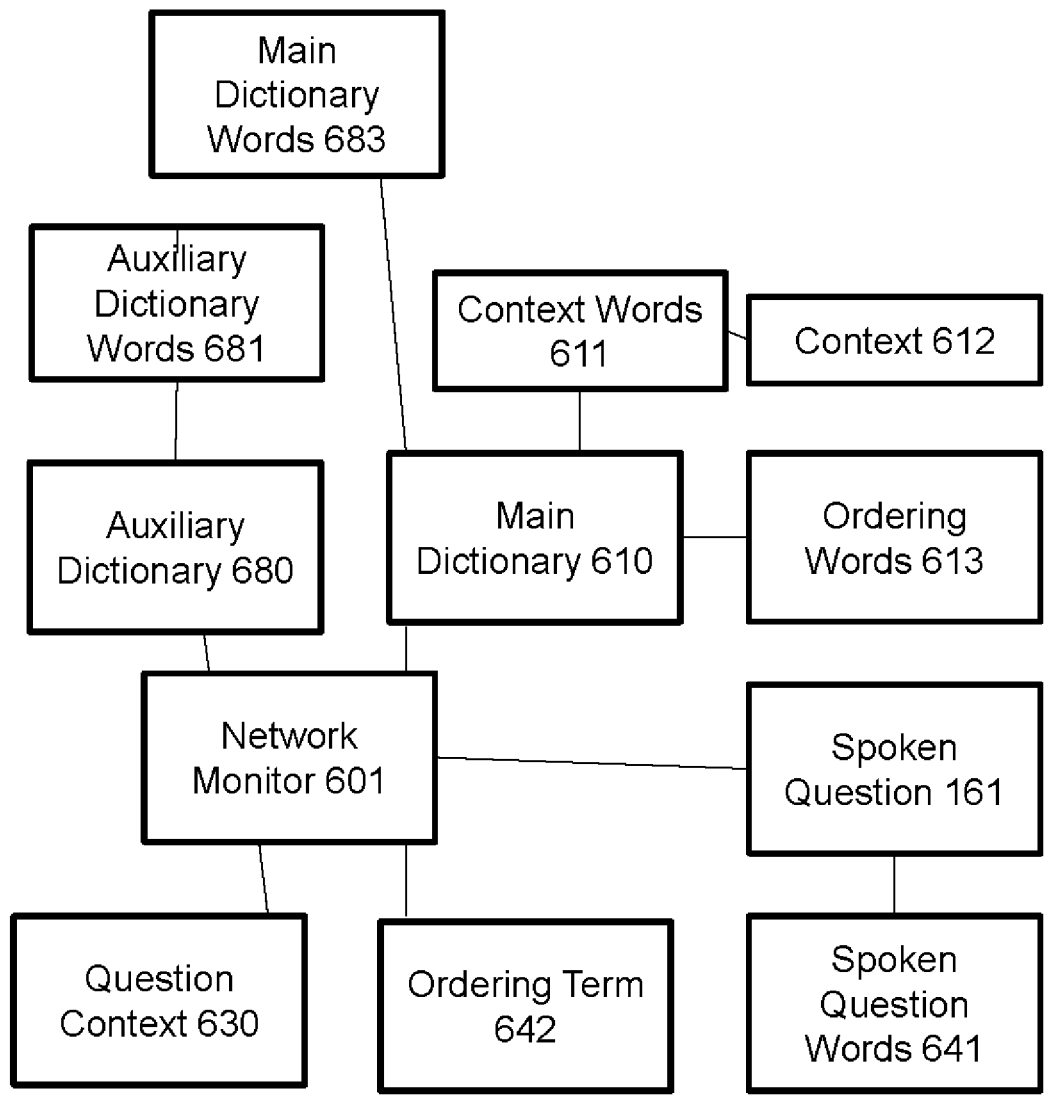
FIG. 10 illustrates an exemplary embodiment process of analyzing spoken question using one or more dictionaries by network monitor.

FIG. 10 illustrates an exemplary embodiment of analyzing spoken question using one or more dictionaries by network monitor. In one embodiment, network monitor 601 includes a main dictionary 610 and optionally an auxiliary dictionary 680. Main dictionary 610 includes one or more words, such as context words 611 and ordering words 613. Auxiliary dictionary 680 includes one or more words 681. Upon receiving spoken question 161 by network monitor 601, network monitor 601 processes spoken question 161 to extract one or more spoken question words 641 from spoken question 161. In one embodiment, spoken question words 641 includes a phrase or a sequence of one or more words. In one embodiment, network monitor 601 matches spoken question words 641 with context words 611 in main dictionary 610 to determine where there are any matches. In one embodiment, network monitor 601 compares spoken question words 641 with ordering words 613 of main dictionary 610. In one embodiment, spoken question words 641 and ordering words 613 are the same, and network monitor 601 is configured to determine that there is a match. In one embodiment, spoken question words 641 and ordering words 613 are phonetically similar, and network monitor 601 is configured to determine that there is a match. For example, spoken question words 641 is "top" and ordering words 613 is "top", and network monitor 601 is configured to determine that there is a match. For example, spoken question words 641 is "tub" and ordering words 613 is "top", and since "tub" is phonetically similar to "top", the network monitor 601 is configured to determine that there is a match. Upon determining spoken question words 641 matches ordering words 613, network monitor 601 stores ordering words 613 as ordering term 642 of spoken question 161.

In one embodiment, network monitor 601 matches spoken question words 641 with context words 611 of main dictionary 610. In one embodiment, each context word 611 is associated with one or more contexts 612, which can be a name context 631, a time context 632, a system context 330, an interface context 332, a protocol context 333, or a network application context 331. In one embodiment, spoken question words 641 and context words 611 are the same, and network monitor 601 is configured to determine that they match. In one embodiment, spoken question words 641 and context words 611 are phonetically similar, and network monitor 601 is configured to determine that they match. Upon determining spoken question words 641 and context words 611 match, network monitors stores context words 611 associated with context 612 in a question context 630 for spoken question 161.

In one embodiment, network monitor 610 matches spoken question words 641 with words 681 in auxiliary dictionary 680. In one embodiment, spoken question words 641 and auxiliary dictionary words 681 are the same, and network monitor 601 is configured to determine that they match. In one embodiment, spoken question words 641 and auxiliary dictionary words 681 are phonetically similar, and network monitor 601 is configured to determine that they match. In one embodiment, auxiliary dictionary words 681 are linked to words 683 in main dictionary 610. Main dictionary words 683 can be classified as ordering words or context words. Network monitor 601 retrieves the linked words 683 from main dictionary 610. In one embodiment, main dictionary words 683 are ordering words 613, and network monitor 601 stores ordering words 613 as ordering term 642 for spoken question 161. In one embodiment, main dictionary words 683 are context words 611 associated with context 612, and network monitor 601 stores context words 611 associated with context 612 in a question context 630 for spoken question 161.

In one embodiment, network monitor 601 determines that spoken question words 641 do not match any words in main dictionary 610 or auxiliary dictionary 680. As a result, the network monitor 601 does not proceed with the processing of any remaining words in the spoken question words.

In one embodiment, after processing words 641 of spoken question 161, network monitor 601 extracts one or more remaining words of spoken question 161 and processes the remaining words using main dictionary 610 and auxiliary dictionary 680 in the same manner as described above.

Figure 11:
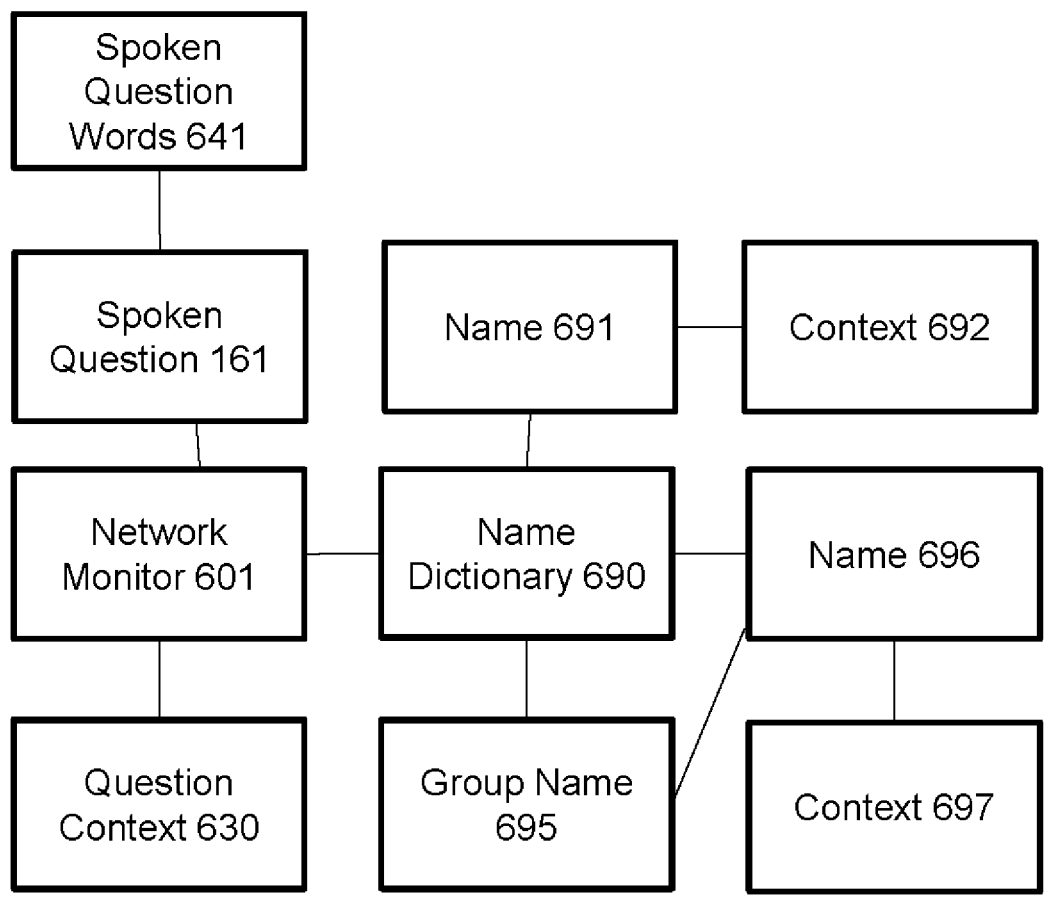
FIG. 11 illustrates an exemplary embodiment of analyzing spoken question using a name dictionary by network monitor.

FIG. 11 illustrates an exemplary embodiment of analyzing spoken question using a name dictionary by network monitor. In one embodiment, network monitor 601 includes a name dictionary 690. Name dictionary 690 stores names and identities corresponding to one or more context of one or more network appliances in a plurality of name entries. In one embodiment, name 691 corresponding to a context 692 is stored in a name entry in name dictionary 690. Name 691 may be "Switch 459", a name of a network appliance, corresponding to a name context 692. Name 691 may be "New York Trunk", a name for interface 4 of a network appliance, corresponding to a quantity interface context (not shown). Name 691 may be "Voice Hub", a name for a network application of a network appliance, corresponding to a network application context (not shown).

In one embodiment, name dictionary 690 includes a group name 695, which is linked to one or more other names, such as name 696 and name 691, in name dictionary 690. For example, group name 695 is "Bay Area Network", linked to name 696, "Palo Alto Broadband Gateway", and name 691, "Menlo Park Voice Gateway".

Network monitor 601 processes words 641 in spoken question 161 using name dictionary 690 in the same manner as described above with reference to FIG. 10. In one embodiment, network monitor 601 determines if there is a match between spoken question words 641 and name 691. In one embodiment, spoken question words 641 and name 691 are the same, and network monitor 601 is configured to determine that they match. In one embodiment, spoken question words 641 and name 691 are phonetically similar, and network monitor 601 is configured to determine that they match. Upon determining spoken question words 641 and name 691 match, network monitor 601 stores name 691 associated with context 692 in a question context 630 for spoken question 161.

In one embodiment, network monitor 601 determines if there is a match between spoken question words 641 and group name 695. In one embodiment, spoken question words 641 and group name 695 are the same, and network monitor 601 is configured to determine that they match. In one embodiment, words 641 and group name 695 are phonetically similar, and network monitor 601 is configured to determine that they match. Upon determining words 641 and name 691 match, network monitor 601 stores, in a question context 630 for spoken question 161, group name 695 and name entries in name dictionary 690 linked to group name 695. In one embodiment, group name 695 is linked to name 691 and name 696. Name 696 is associated with context 697. Network monitor 601 stores name 696 associated with context 697 and name 691 associated with context 692 in question context 630 for spoken question 161.

In one embodiment, network monitor 601 obtains name dictionary 690 from another computing device, a network computing server, or a network management system. In one embodiment, network monitor 601 obtains name dictionary 690 through a configuration process previously executed within network monitor 601. In one embodiment, a network administrator inputs name entries of name dictionary 690 into network monitor 601.

Figure 12:
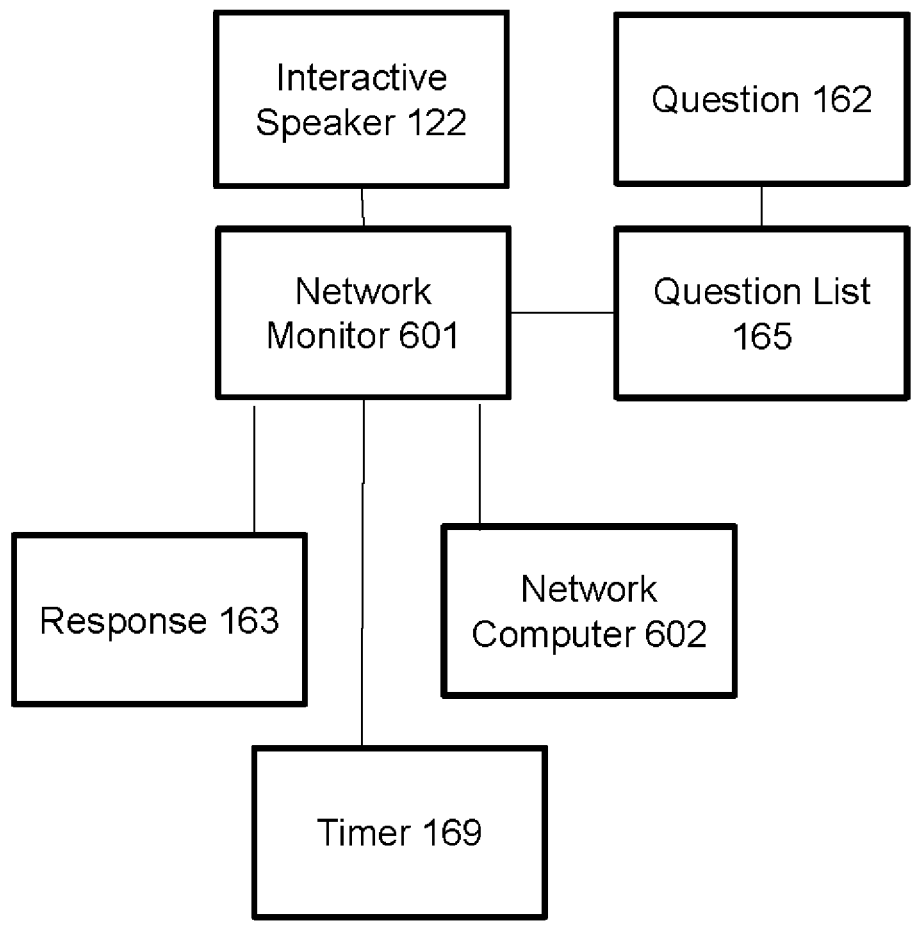
FIG. 12 illustrates an exemplary embodiment of processing a pre-stored question by network monitor.

FIG. 12 illustrates an exemplary embodiment of processing a pre-stored question by network monitor. In one embodiment, network monitor 601 includes a pre-stored question list 165, which stores one or more questions such as question 162. The questions on the question list 165 may be configured by a user 101. For example, often used questions or questions to be repeated at intervals may be stored in the question list 165. In one embodiment, network monitor 601 selects and processes question 162 from question list 165 to generate a response 163. In one embodiment, network monitor 601 converts the response 163 to audio signals, and sends the audio signals of the response 163 to interactive speaker 122, which may play the audio signals of the response 163 to user.

In one embodiment, network monitor 601 sets a timer 169 and processes question 162 when timer 169 expires. In one embodiment, network monitor 601 processes question list 165 from time to time, every hour, every other hour, every morning at 8 am, every night approximately at 11 pm. In one embodiment, network monitor 601 processes question list 165 in response to receiving a request from a network computer 602.

Referring to the Figures above, in one embodiment, network monitor 601 receives a significantly large number of log entries 321, and would require a significant amount of computing resources to process the log entries 31. Resources saved may include CPU cycles, memory, storage, etc. The number of received log entries 321 would be proportional to the number of network appliance in the data network 501, the number quantity contexts 623 of each network appliance, and the number of time units where a log entry for a quantity context 623 is received. In one embodiment, the data network 501 is configured to collect a log entry every minute for each interface, each protocol, each session protocol, and each network application. A network appliance would generate 1440 log entries for each quantity context a day, or about 10,000 log entries a week. In one embodiment, a network appliance, such as an Ethernet switch, can have 10 interface cards, each with 48 ports, and thus a total of 480 ports or interfaces. Together with protocols, sessions, and applications, the network appliance generates about 500 log entries each minute, 720,000 log entries a day, over 5 million log entries a week, and over 262 million log entries a year. In one embodiment, a data network of 100 network appliances would generate over 26 billion log entries in a year.

Network monitor 601 uses one or more question context 630 to reduce the amount of log entries to process in order to produce the response to the spoken question 161. This in turn reduces the computing resources required and allows the processing to occur in less time. In one embodiment, network monitor 601 groups the received log entries according to name context 631 of the log entries. Subsequently, network monitor 601 retrieves the log entries by matching the grouped name context 631 to the name context within the question context 630. Thus, network monitor 601 avoids expending resources to examine log entries that do not contain matching name contexts.

In one embodiment, network monitor 601 groups the received log entries by time context 632, for example, by year and day or by hour. Subsequently network monitor 601 matches the grouped time context to the time context 632 within the question context 630 to retrieve the one or more log entries in the matched grouped time context. Thus, network monitor 601 avoids expending computing resources to examine log entries that do not contain matching time contexts. In another embodiment, network monitor 601 groups the received log entries according to interface identity, protocol name, session protocol name, application identity or name. Network monitor 601 may further group received log entries using a combination of contexts, such that network monitor 601 can efficiently select the log entries matching the one or more question contexts in the spoken question 161, in order to reduce the processing time to generate a response 163 to the spoken question 161. Such processing optimization allows the network monitor 601 to produce the response 163 in real-time.

In one embodiment, network monitor 601 uses the ordering term 642 in the spoken question 161 to reduce the amount of computing resources consumed and the time needed to process the spoken question 161. In one embodiment, the user 101 asks for the top applications with the data network 501. Network monitor 601 produces the response 163 with the top 2 interfaces in the data network 501. For example, network monitor 601, upon processing the log entries, may generate 10,000 result entries. Sorting the 10,000 result entries typically require a N log N sorting algorithm, or about 40,000 instructions. Instead of sorting the 10,000 result entries and then selecting the top 2 upon sorting, network monitor 601 selects the first top interface and then the second top interface, which requires about 20,000 instructions. By taking advantage of the ordering term 642 in the spoken question 161, network monitor 601 reduces the computer resources needed to process the log entries by half. In one embodiment, network monitor 601 may assess the processing needs to determine an algorithm to use to optimize resource savings.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer usable or computer readable storage medium providing program code for use by or in connection with a computer or any instruction execution system. For the purposes of this description, a computer usable or computer readable storage medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a voice-based real-time interactive network monitoring of network appliances in a data network:
    (a) collecting, by a network monitor system, a plurality of log entries from a plurality of network appliances in the data network, each log entry comprising a quantity context, a first time context, a first name context, and a value of the quantity context;
    (b) receiving, by the network monitor system, a spoken question inputting by a user;
    (c) processing the spoken question, by the network monitor system, comprising:
        (c1) determining a question context comprised in the spoken question, the question context comprising a second name context, a second time context, and a quantity entity context;
        (c2) comparing the question context with one or more given log entries; and
        (c3) for each given log entry matching the question context, storing the quantity context and the value of the quantity context in the given log entry as a result entry in a result entries list;
    (d) composing, by the network monitor system, a response according to the result entries; and
    (e) outputting, by the network monitor system, the response for playing to the user.

2. The method of claim 1, wherein the response comprises one or more of the following: an audio clip; a plurality of audio signals; a piece of text or data to be converted to speech; and an URL link.

3. The method of claim 1, wherein the determining (c1) and the composing (d) comprise:
    (c1i) determining an ordering term and the question context comprised in the spoken question;
    (d1) ordering, by the network monitor system, the result entries on the result entries list according to the ordering term; and
    (d2) composing, by the network monitor system, the response according to the ordered result entries.

4. The method of claim 3, wherein the ordering term indicates a hotspot, top usage, or busy usage.

5. The method of claim 1, wherein the determining (c1) comprises:
    (c1i) determining one or more words comprised in the spoken question;
    (c1ii) comparing the one or more words comprised in the spoken question with a main dictionary and a name dictionary, the main dictionary comprising a plurality of context words associated with a plurality of contexts, the name dictionary comprising a plurality of identities corresponding to contexts of the plurality of network appliances;
    (c1iii) upon finding a match between the one or more words comprised in the spoken question and a given context word of the plurality of context words in the main dictionary, storing the given context word and the context associated with the given context word in the quantity entity context; and
    (c1iv) upon finding a match between the one or more words comprised in the spoken question with a given identity in the name dictionary, storing the given identity in the second name context.

6. The method of claim 1, wherein the value of the quantity context is associated with an activity or resource usage, wherein the quantity context comprises a first network application context indicating a first network application involved in the activity or the resource usage, wherein the quantity entity context comprises a second network application context indicating a second network application, wherein the comparing (c2) comprises:

(c2i) comparing the first name context in the one or more given log entries and the second name context in the question context; and (c2ii) comparing the first network application context in the one or more given log entries and the second network application context in the question context.

7. The method of claim 6, wherein the first or second network application context indicates one or more of the following: voice over IP; web protocol; proxy; server load balancing; virtual private network; or content caching.

8. The method of claim 6, wherein the quantity context indicates one or more of the following: a session usage; a system resource usage; and a network interface resource usage of the first network application.

9. The method of claim 6, wherein the first network application comprises a security application.

10. A non-transitory computer readable medium comprising computer readable program code embodied therein for providing a voice-based real-time interactive network monitoring of network appliances in a data network, wherein when executed by one or more processors causes the one or more processors to:

(a) collect a plurality of log entries from a plurality of network appliances in the data network, each log entry comprising a quantity context, a first time context, a first name context, and a value of the quantity context;

(b) receive a spoken question inputting by a user;

(c) process the spoken question comprising:

(c1) determine a question context comprised in the spoken question, the question context comprising a second name context, a second time context, and a quantity entity context;

(c2) compare the question context with one or more given log entries; and (c3) for each given log entry matching the question context, store the quantity context and the value of the quantity context in the given log entry as a result entry in a result entries list;

(d) compose a response according to the result entries; and (e) output the response for playing to the user.

11. The medium of claim 10, wherein the response comprises one or more of the following: an audio clip; a plurality of audio signals; a piece of text or data to be converted to speech; and an URL link.

12. The medium of claim 10, wherein the determine (c1) and the compose (d) comprise:

(c1i) determine an ordering term and the question context comprised in the spoken question;

(d1) order the result entries on the result entries list according to the ordering term; and (d2) compose the response according to the ordered result entries.

13. The medium of claim 12, wherein the ordering term indicates a hotspot, top usage, or busy usage.

14. The medium of claim 10, wherein the determine (c1) comprises:

(c1i) determine one or more words comprised in the spoken question;

(c1ii) compare the one or more words comprised in the spoken question with a main dictionary and a name dictionary, the main dictionary comprising a plurality of context words associated with a plurality of contexts, the name dictionary comprising a plurality of identities corresponding to contexts of the plurality of network appliances;

(c1iii) upon finding a match between the one or more words comprised in the spoken question and a given context word of the plurality of context words in the main dictionary, store the given context word and the context associated with the given context word in the quantity entity context; and (c1iv) upon finding a match between the one or more words comprised in the spoken question with a given identity in the name dictionary, storing the given identity in the second name context.

15. The medium of claim 10, wherein the value of the quantity context is associated with an activity or resource usage, wherein the quantity context comprises a first network application context indicating a first network application involved in the activity or the resource usage, wherein the quantity entity context comprises a second network application context indicating a second network application, wherein the compare (c2) comprises:

(c2i) compare the first name context in the one or more given log entries and the second name context in the question context; and (c2ii) compare the first network application context in the one or more given log entries and the second network application context in the question context.

16. The medium of claim 15, wherein the first or second network application context indicates one or more of the following: voice over IP; web protocol; proxy; server load balancing; virtual private network; or content caching.

17. The medium of claim 15, wherein the quantity context indicates one or more of the following: a session usage; a system resource usage; and a network interface resource usage of the first network application.

18. The medium of claim 15, wherein the first network application comprises a security application.

19. A system, comprising:

one or more processors; and a non-transitory computer readable medium comprising computer readable program code embodied therein for providing a voice-based real-time interactive network monitoring of network appliances in a data network, wherein when executed by the one or more processors causes the one or more processors to:

(a) collect a plurality of log entries from a plurality of network appliances in the data network, each log entry comprising a quantity context, a first time context, a first name context, and a value of the quantity context;

(b) receive a spoken question inputting by a user;

(c) process the spoken question comprising:

(c1) determine a question context comprised in the spoken question, the question context comprising a second name context, a second time context, and a quantity entity context;

(c2) compare the question context with one or more given log entries; and (c3) for each given log entry matching the question context, store the quantity context and the value of the quantity context in the given log entry as a result entry in a result entries list;

(d) compose a response according to the result entries; and (e) output the response for playing to the user.

20. The system of claim 19, wherein the response comprises one or more of the following: an audio clip; a plurality of audio signals; a piece of text or data to be converted to speech; and an URL link.

21. The system of claim 19, wherein the determine (c1) and the compose (d) comprise:
   (c1i) determine an ordering term and the question context comprised in the spoken question;
   (d1) order the result entries on the result entries list according to the ordering term; and
   (d2) compose the response according to the ordered result entries.

22. The system of claim 21, wherein the ordering term indicates a hotspot, top usage, or busy usage.

23. The system of claim 19, wherein the determine (c1) comprises:
   (c1i) determine one or more words comprised in the spoken question;
   (c1ii) compare the one or more words comprised in the spoken question with a main dictionary and a name dictionary, the main dictionary comprising a plurality of context words associated with a plurality of contexts, the name dictionary comprising a plurality of identities corresponding to contexts of the plurality of network appliances;
   (c1iii) upon finding a match between the one or more words comprised in the spoken question and a given context word of the plurality of context words in the main dictionary, store the given context word and the context associated with the given context word in the quantity entity context; and
   (c1iv) upon finding a match between the one or more words comprised in the spoken question with a given identity in the name dictionary, storing the given identity in the second name context.

24. The system of claim 19, wherein the value of the quantity context is associated with an activity or resource usage, wherein the quantity context comprises a first network application context indicating a first network application involved in the activity or the resource usage,
   wherein the quantity entity context comprises a second network application context indicating a second network application, wherein the compare (c2) comprises:
   (c2i) compare the first name context in the one or more given log entries and the second name context in the question context; and
   (c2ii) compare the first network application context in the one or more given log entries and the second network application context in the question context.

25. The system of claim 24, wherein the first or second network application context indicates one or more of the following: voice over IP; web protocol; proxy; server load balancing; virtual private network; or content caching.

26. The system of claim 24, wherein the quantity context indicates one or more of the following: a session usage; a system resource usage; and a network interface resource usage of the first network application.

27. The system of claim 24, wherein the first network application comprises a security application.

* * * * *